United States Patent
Kiderman et al.

(10) Patent No.: US 6,843,378 B1
(45) Date of Patent: Jan. 18, 2005

(54) FILTER UNIT WITH HIGH-PRESSURE FILTER CAP

(75) Inventors: Alexander D. Kiderman, Pittsburgh, PA (US); Michael J. Schmitt, Pittsburgh, PA (US)

(73) Assignee: Schroeder Industries LLC, McKees Rocks, PA (US)

( * ) Notice: Subject to any disclaimer, the term of this patent is extended or adjusted under 35 U.S.C. 154(b) by 139 days.

(21) Appl. No.: 10/278,709

(22) Filed: Oct. 23, 2002

Related U.S. Application Data

(60) Provisional application No. 60/335,089, filed on Oct. 23, 2001.

(51) Int. Cl.[7] .............................................. B01D 35/24
(52) U.S. Cl. ...................................... 210/450; 220/304
(58) Field of Search ................................ 210/435, 443, 210/450, 453, 440, 444; 220/304; 285/108, 379, 901

(56) References Cited

U.S. PATENT DOCUMENTS

| 2,696,915 | A | * | 12/1954 | Kasten et al. ................ 210/437 |
| 4,617,117 | A | * | 10/1986 | Messinger et al. ........ 210/198.1 |
| 5,413,712 | A | * | 5/1995 | Gewiss et al. .............. 210/450 |
| 6,235,194 | B1 | * | 5/2001 | Jousset ........................ 210/206 |

* cited by examiner

Primary Examiner—Matthew O. Savage
(74) Attorney, Agent, or Firm—Blynn L. Shideler; Krisanne Shideler; BLK Law Group

(57) ABSTRACT

A high pressure filter cap configured to withstand a high pressure differential and to minimize the deposit of residue on the filter cap threads. The body of the cap has, protruding from its lower surface, two circular flanges concentrically arranged about a central axis. The outer flange is threaded on its inner surface to engage the threads of a filter housing. The inner flange accommodates, on its outer surface, a sealing component such as an o-ring. A retainer, removably attached to the cap, holds the sealing component in place.

4 Claims, 2 Drawing Sheets

FILTER UNIT WITH HIGH-PRESSURE FILTER CAP

CROSS-REFERENCE TO RELATED APPLICATIONS

This application claims the benefit of U.S. Provisional Patent Application Ser. No. 60/335,089, filed Oct. 23, 2001.

BACKGROUND OF THE INVENTION

1. Field of the Invention

The present invention relates to a filter unit having cap arrangement providing the ability to close a filter housing containing a filter, in which the cap arrangement has the ability to withstand high pressure.

2. Description of the Prior Art

Filter caps are known for use in providing closure to filter housings. Filter housings are used to hold filters and to direct fluid through them. In the course of operation, residue collects on or in the filter, and the filter housing is opened periodically for the replacement of filters. Filter cap designs accommodate the need for ease in opening the filter housing for inspection or replacement of filters, as well as the need to contain a pressure differential between the inside and the outside of the filter housing. Many current designs make use of a threaded connection between the filter cap and the filter housing; threads bear the load and the threaded assembly can be disassembled easily. It is also common to incorporate o-rings, gaskets or other seals in the cap assembly to prevent fluid from leaking between filter cap and filter housing.

It is known in the art that material contained in the fluid in the filter housing, such as grit, dirt, sludge or other residue, may be carried out of the filter housing during filter replacement and may be deposited on the threads of the filter housing or the filter cap. The result of residue deposit on the threads may be the inability to obtain a leak-tight seal, thread wear or occlusion, or difficulty in removing the filter cap from the filter housing.

Accordingly, an object of the present invention is to provide a high-pressure filter cap in which the threads are arranged to minimize contact with solid residue. It is also an object of the present invention to provide a high-pressure filter cap in which the threads are arranged to maximize the ability of the filter cap to withstand a high pressure differential, the seal and threads are arranged to minimize the deposit of residue on the threads, and the seal is arranged to maximize the ability of the seal to withstand a high pressure differential.

SUMMARY OF THE INVENTION

The present invention is a filter unit having a high pressure filter cap configured to withstand a high pressure differential and to minimize the deposit of residue on the filter cap threads. The body of the cap has, protruding from its lower surface, two annular flanges concentrically arranged about a central axis. The outer flange is threaded on its radially inner surface to engage corresponding outer facing threads of a filter housing. The inner flange accommodates, on its outer radial surface, a sealing component such as an o-ring. A retainer, removably attached to the cap, holds the sealing component in place.

These and other advantages of the present invention will be clarified in the description of the preferred embodiments wherein like reference numerals represent like elements throughout.

DETAILED DESCRIPTION OF THE INVENTION

Figure 1:
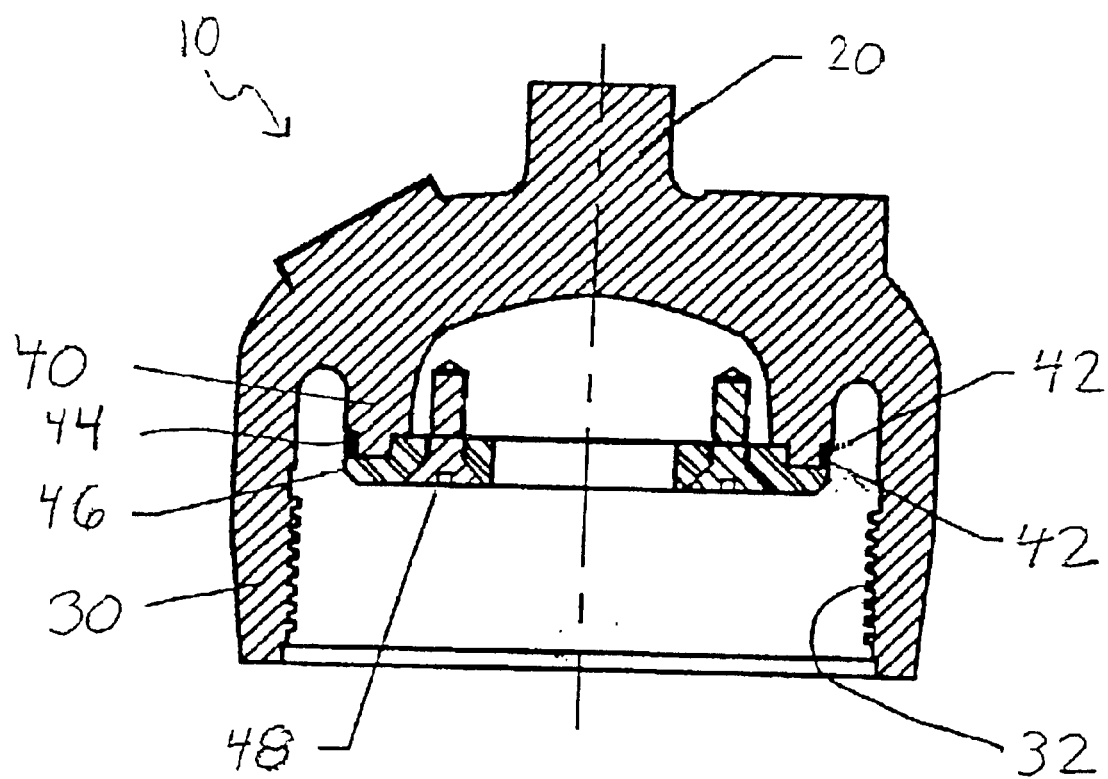
FIG. 1 is a section view of a high pressure filter cap in accordance with the present invention.

Referring to FIG. 1, the present invention is a high pressure filter cap 10 that includes a body 20 having an upper surface and a lower surface. An outer annular flange 30, describing a circle about a central axis of cap 10, protrudes from the lower surface of body 20. Outer flange 30 has an interior surface facing the central axis of cap 10. Threads 32, disposed circumferentially on the interior surface of flange 30, are configured to threadedly engage a filter housing as described below. An inner annular flange 40, located concentrically within outer flange 30 and describing a circle about the central axis of cap 10, protrudes from the lower surface of body 20. Inner flange 40 has an exterior surface facing away from the central axis of cap 10. A sealing component 42 is disposed circumferentially on the exterior, outer radial surface of inner flange 40. Sealing component 42 forms a seal between cap 10 and an inner radial surface of the filter housing when cap 10 is in use. Sealing component may be, for example, one or more o-rings or one or more gaskets. In a preferred embodiment of the invention, the exterior surface of circular flange 40 contains a circumferential recess 44 to accommodate the sealing component 42. A retainer 46 is removably attached to inner flange 40; when attached, it forms a portion of the circumferential recess 44 and holds sealing component 42 in place. One or more fasteners 48, such as screws, bolts or clips, fasten retainer 46 removably to inner flange 40.

Figure 2:
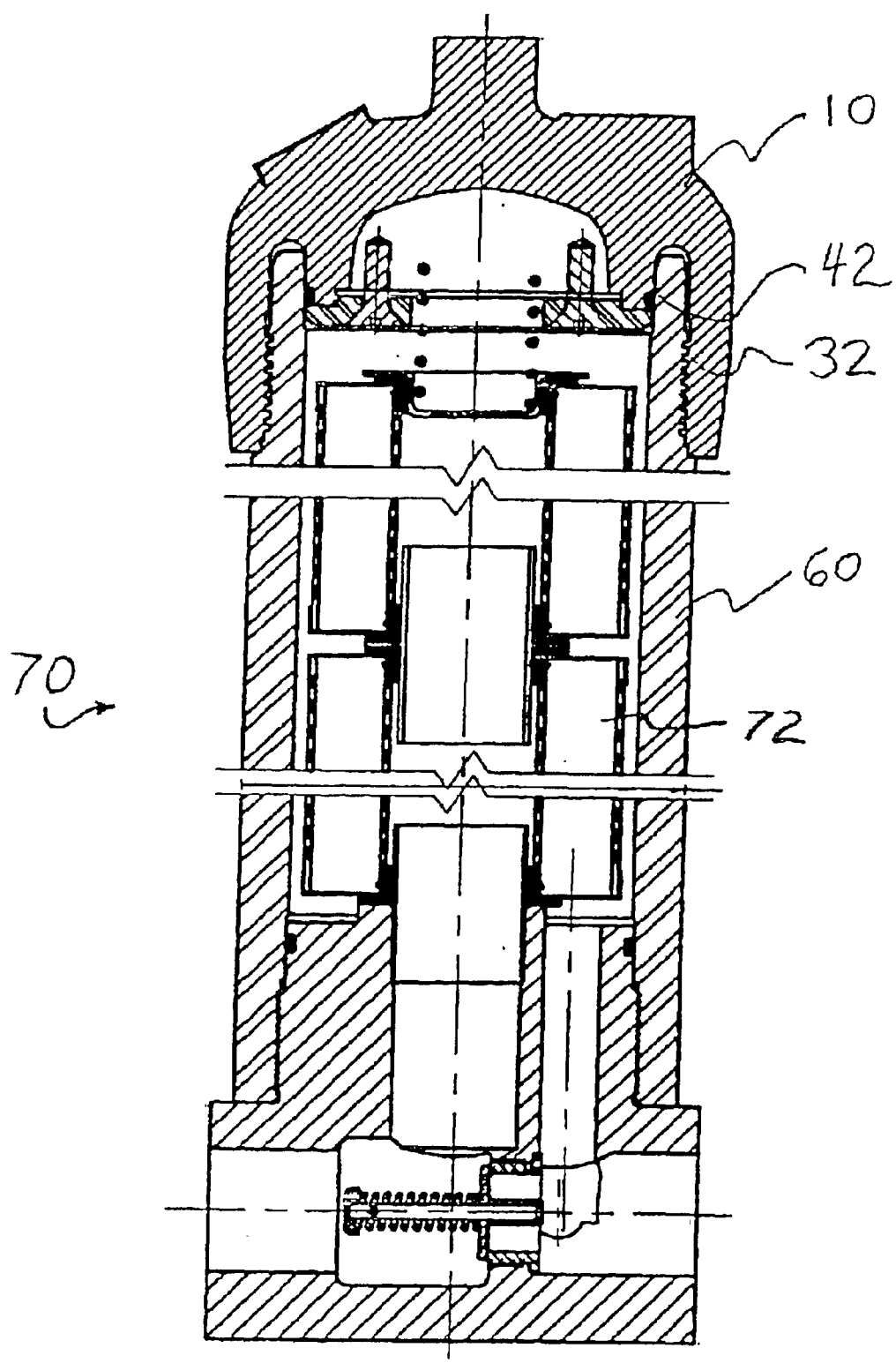
FIG. 2 is a section view of a filter unit having the high pressure filter cap of FIG. 1 in operation with a filter housing in accordance with the present invention.

Referring to FIG. 2, cap 10 is threadedly engaged to a filter housing 60 when in use in the filter unit 70. The filter unit 70 also includes a replacable filter 72 and associated components as is well known in the art. The new features of the filter unit 70 are found in the cap 10 and the connection and sealing of the cap 10 with the filter housing 60. Threads 32 of cap 10 engage with corresponding threads on the exterior radial surface of the filter housing 60. Sealing component 42 comes in frictional contact with the interior radial surface of the filter housing 60 and forms a seal therewith.

In use, the filter 72 contained in the filter housing 60 removes residue from the fluid passing through the filter housing 60. This residue is retained in the filter or on interior surfaces of the filter housing 60, but is prevented from leaving the filter enclosure by sealing component 42. The configuration of cap 10 and the isolation of threads 32 from sealing component 42 prevent residue from coming on contact with threads 32 in use or during the filter changing process.

The radius of the inner flange 40 from the central axis is smaller than the corresponding radius of the outer flange 30. Consequently, the radius of the sealing component 42 from the central axis is smaller than the radius of threads 32. The larger radius of threads 32 from the central axis increases the load that they can handle. The smaller radius of sealing component 42 from the central axis results in a decreased load on sealing component 42. Because the cap 10 and filter housing 60 are generally constructed of stronger and less deformable materials than are used in sealing component 42, it is preferable to increase the load exerted on threads 32 and decrease the load exerted on sealing component 42.

It will be apparent to those of ordinary skill in the art that various modifications may be made to the present invention without departing from the spirit and scope thereof. The described embodiments are intended merely to be illustrative of the concepts of the present invention and not restrictive thereof.

We claim:

1. A high pressure filter cap comprising:

a body having an upper surface, a lower surface, and a central axis;

an outer flange protruding from the lower surface of the body around the central axis, the outer flange having an interior surface facing radially inwardly;

threads disposed circumferentially on the interior surface of the outer flange configured to threadingly engage a filter housing;

an inner annular flange protruding from the lower surface of the body concentric within the outer flange, the inner flange having an exterior surface facing radially outwardly;

a sealing component, disposed circumferentially on the exterior surface of the inner flange configured to seal against a surface of the filter housing; and a retainer, removeably attached to the inner flange, forming in conjunction therewith a circumferential recess accommodating the sealing component.

2. The cap of claim 1, wherein the sealing component comprises at least one o-ring.

3. A filter unit comprising:

A filter housing having an interior surface defining a filter chamber and an exterior surface having threads thereon;

A filter contained within the filter chamber;

A high pressure filter cap including
  i) a body having an upper surface, a lower surface, and a central axis,
  ii) an outer flange protruding from the lower surface of the body around the central axis, the outer flange having an interior surface facing radially inwardly,
  iii) threads disposed circumferentially on the interior surface of the outer flange which threadingly engage the threads of the filter housing,
  iv) an inner annular flange protruding from the lower surface of the body concentric within the outer flange, the inner flange having an exterior surface facing radially outwardly,
  v) a sealing component, disposed circumferentially on the exterior surface of the inner flange configured to seal against a surface of the filter housing, and
  vi) a retainer, removeably attached to the inner flange, forming in conjunction therewith a circumferential recess accommodating the sealing component.

4. The filter unit of claim 3, wherein the sealing component comprises at least one o-ring.

\* \* \* \* \*